United States Patent [19]

Tye et al.

[11] 4,221,853

[45] Sep. 9, 1980

[54] DRY ELECTRIC CELLS

[75] Inventors: Frank L. Tye, Pinner; John E. A. Shaw; Andrzej K. Agopsowicz, both of London, all of England

[73] Assignee: Berec Group Limited, London, England

[21] Appl. No.: 15,141

[22] Filed: Feb. 26, 1979

[30] Foreign Application Priority Data

Mar. 2, 1978 [GB] United Kingdom ............... 8356/78

[51] Int. Cl.² ............................................. H01M 4/50
[52] U.S. Cl. ................................................... 429/224
[58] Field of Search ......................................... 429/224

[56] References Cited

U.S. PATENT DOCUMENTS

| | | | |
|---|---|---|---|
| 1,173,965 | 2/1916 | Hickmann | 429/224 |
| 1,430,726 | 10/1922 | Olaneta | 429/224 |
| 3,242,013 | 3/1966 | Mehne et al. | 429/224 |

*Primary Examiner*—Donald L. Walton
*Attorney, Agent, or Firm*—Burns, Doane, Swecker & Mathis

[57] ABSTRACT

A dry electric cell of the Leclanché type having a cathode mix which includes (i) $MnO_2$ having a $\beta$-crystal structure, and (ii) either hetaerolite ($ZnO.Mn_2O_3$) or materials which enable hetaerolite to be generated in situ at a sufficiently rapid rate so that it constitutes the major discharge product even at moderate to high rates of discharge.

6 Claims, 2 Drawing Figures

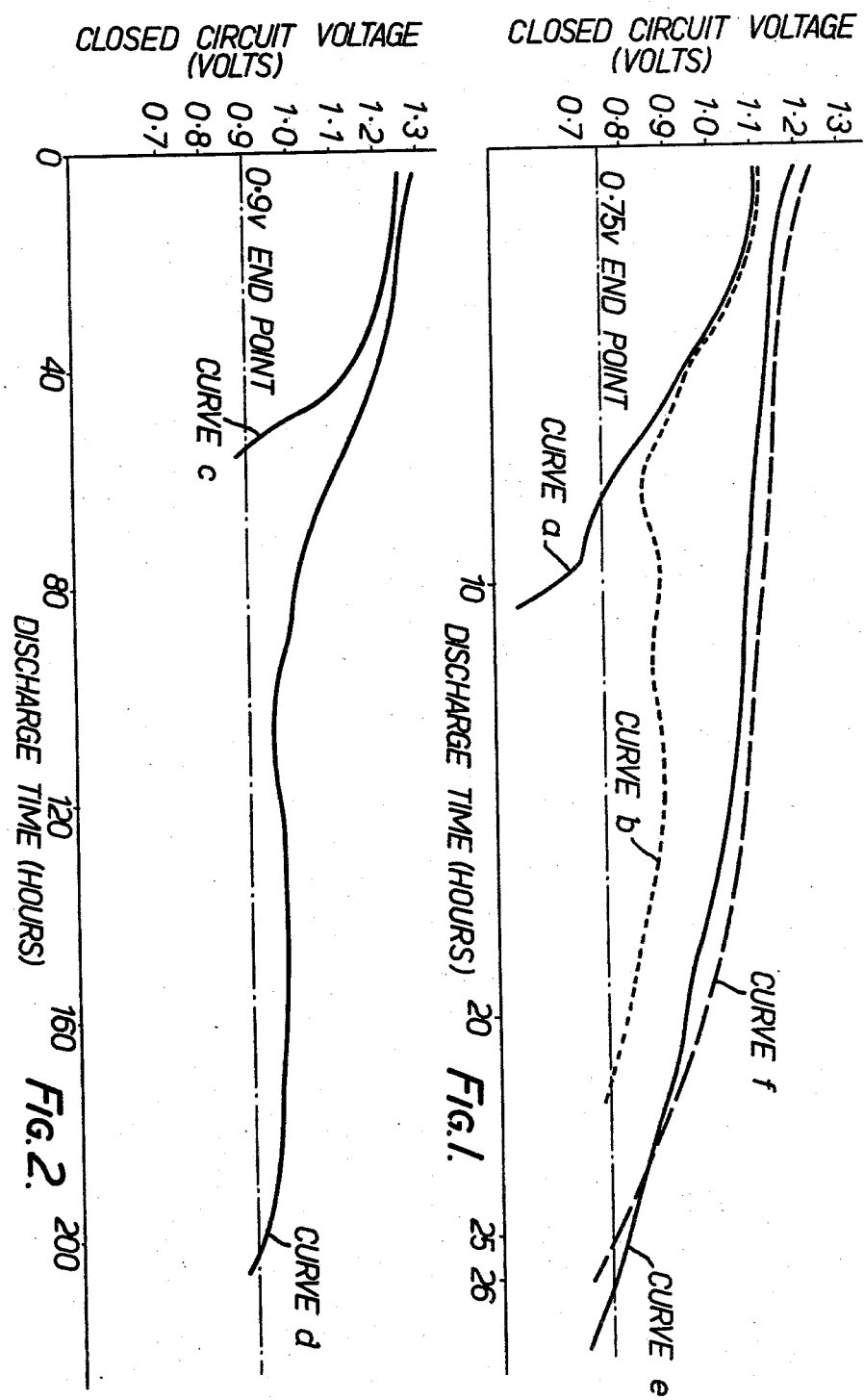

DRY ELECTRIC CELLS

The present invention relates to dry electric cells of the Leclanché type.

Cathode mixes for dry cells of the Leclanché type usually contain manganese dioxide, zinc oxide, carbon black, zinc chloride, ammonium chloride and sometimes graphite. The best cell capacities are achieved by using chemically or electrolytically manufactured manganese dioxides. Such manganese dioxides usually have an γ or ρ crystal structure and usually contain about 90% $MnO_2$.

Naturally occurring manganese dioxides can also be used in cathode mixes for Leclanché cells because they are much cheaper although they give somewhat poorer cell capacities. The naturally occurring ores which are generally preferred for use in cathode mixes for such cells also have the γ or ρ crystal structure and after appropriate refining generally contain up to 82% $MnO_2$. Deposits of this type of ore are scarce and in some cases nearing exhaustion.

The most common naturally occurring type of manganese ore is pyrolusite in which the manganese dioxide has a β-crystal structure ($\beta$-$MnO_2$). ALthough grades of pyrolusite containing up to 92% $MnO_2$ are available, the pyrolusite ores are generally known to give very poor results when used in cathode mixes for cells of the Leclanché type.

The superior capacity of cells containing γ and ρ crystalline manganese dioxides has been ascribed to the fact that they undergo electrochemical reduction in the homogeneous phase down to a composition represented by $MnO_{1.5}$.

The overall cell reaction is

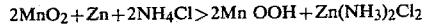
$2MnO_2 + Zn + 2NH_4Cl > 2Mn\ OOH + Zn(NH_3)_2Cl_2$

In contrast, in cells containing $\beta$-$MnO_2$, the electrochemical reduction proceeds in the heterogeneous phase. In such cells, the overall cell reaction predominantly is $MnO_2 + Zn + 4NH_4Cl + Zn\ Cl_2 > Mn\ Cl_2 + 2Zn(NH_3)Cl_2 + H_2O$ which results in consumption of the electrolyte salts $NH_4Cl$ and $ZnCl_2$ in the cell. The working life of cells of this type is thus limited by the exhaustion of these electrolyte salts.

We have now found that in certain circumstances high capacity cells in which the manganese dioxide in the cathode mix is all or predominantly $\beta$-$MnO_2$ can be obtained.

In the drawings, FIGS. 1 and 2 illustrate the discharge rates of several dry electric cells of the Leclanché type and demonstrate the improved results obtained by dry electric cells according to the present invention.

Accordingly, the present invention provides a dry electric cell of the Leclanché type having a cathode mix which includes (i) $MnO_2$ having a β-crystal structure, and (ii) either hetaerolite ($ZnO.Mn_2O_3$) or materials which enable hetaerolite to be generated in situ at a sufficiently rapid rate so that it constitutes the major discharge product even at moderate to high rates of discharge.

In this specification the terms "moderate" and "high" rates of discharge are used to mean discharge rates for Leclanché cells of the order given in the International Electrotechnical Commission's (IEC) publication No. 86-2 (Primary Batteries) for a given size of battery as suitable for application in "portable lighting", "transistor radios" and "pocket calculators".

We have found that $\beta$-$MnO_2$ can be utilised efficiently in dry electric cells provided that hetaerolite is the discharge product of the cell. Under typical discharge conditions hetaerolite does not appear to nucleate spontaneously when untreated $\beta$-$MnO_2$ ore is used alone. However, if hetaerolite nuclei are provided by appropriate pretreatment of the $\beta$-$MnO_2$ ore, or by by addition of hetaerolite to the cathode mix, or by addition to the cathode mix of a manganese dioxide which produces hetaerolite spontaneously as a result of discharge, the main overall discharge product formed in the cell will be hetaerolite. The result of the pretreatment of the ore or the use of the additives which include or generate hetaerolite at a sufficiently rapid rate is that the $\beta$-$MnO_2$ is reduced with high efficiency in the cell. Furthermore, when the main discharge product is hetaerolite, little or no ammonium chloride or zinc chloride are consumed when the cell is in operation. Thus less ammonium chloride and more manganese dioxide can therefore be included in the cell to improve its capacity.

The $\beta$-$MnO_2$ is preferably obtained as a naturally-occurring ore such as pyrolusite.

Preferably 40-100% of the total weight of the $MnO_2$ in the cathode mix of the cell of the present invention is $\beta$-$MnO_2$.

Synthetically prepared hetaerolite is an example of a type of hetaerolite which can be added to the cathode mix as a separate ingredient. An alternative source of hetaerolite is $\beta$-$MnO_2$ containing ore pretreated in the presence of zinc or a compound of zinc so as to produce some hetaerolite phase in the ore.

Alternatively, the hetaerolite phase can be generated in situ in the cathode mix by incorporating in the cathode mix materials which enable hetaerolite to be formed at a sufficiently rapid rate so that it constitutes the major discharge product even at moderate to high rates of discharge when the cell is discharged. Examples of such materials are certain types of chemically precipitated manganese dioxides which, in the presence of zinc of a zinc compound, are capable or generating hetaerolite. Manganese dioxide precipitated by the action of bleaching powder on manganous chloride solution and an acid washed precipitated manganese dioxide obtained as a by-product of saccharin manufacture are found to be particularly effective for this purpose. In a preferred embodiment of the cell of the present invention up to 60% by weight of the $MnO_2$ in the cathode mix is such a chemically precipitated $MnO_2$.

It has been found that in the cells of the present invention optimum efficiency can be obtained even though an amount of ammonium chloride which is smaller than the amount usually found necessary in corresponding cells containing γ and ρ manganese dioxides is used. Therefore, cathode mixes can contain a greater proportion of manganese dioxides and this results in the cells having excellent capacities.

The invention also provides a battery including one or more cells according to the present invention.

The following Examples illustrate the invention.

EXAMPLE 1

Pretreatment of $\beta$-$MnO_2$ to produce hetaerolite

A solution was prepared by mixing equal volumes of aqueous zinc chloride solution (S.G. 1.45) and water. The solution was then saturated at 25° C. with respect to ammonium chloride and zinc oxide. To 100 ml of this solution were added:

| | |
|---|---|
| 92% grade $\beta$-MnO$_2$ ore of Moroccan origin | 50g |
| Hydrated manganous chloride MnCl$_2$ . 4H$_2$O | 3.25g |
| Zinc oxide | 3g |
| Ammonium chloride | 4g |

The slurry was stirred for 4 days at temperatures in the range 80°–90° C. The solids were then filtered off, washed and dried. X-Ray diffraction analysis of the resultant treated ore showed, in addition to the phases originally present in the ore, a trace of hetaerolite ZnO.Mn$_2$O$_3$.

Two separate cathode mixes were prepared using treated and untreated ore according to the formulation:

| | |
|---|---|
| Manganese dioxide (treated or untreated) | 23.08g |
| Zinc oxide | 0.25g |
| Ammonium chloride | 11.36g |
| Acetylene black | 3.55g |
| Zinc chloride solution (S.G. 1.45) | 7.47g |
| Water | 4.25g |

Two paper lined R20 size cells containing 48.1 g cathode mix per cell were made. Each cell was subjected to a discharge test through a 5 ohm resistance for 30 minutes per day, 7 days per week at 20° C. The discharge curves and the open circuit voltages measured immediately before each discharge cycle are plotted in FIG. 1 as curve a for untreated ore and curve b for treated ore. It can be seen that the cell which had been made with the untreated ore give a steeply falling discharge curve. Its on load voltage fell below 0.75 v. after 8.5 hours total discharge. On the other hand the cell which had been made with treated ore gave a flatter discharge curve and sustained an on load voltage above 0.75 v for 21.5 hours of discharge.

After discharge the cells were opened, the discharged cathode mixes extracted and subjected to X-ray diffraction analysis. No hetaerolite could be detected in the mix made with untreated ore while a strong diffraction pattern corresponding to hetaerolite was recorded on the mix made with treated ore.

EXAMPLE 2

Addition of Hetaerolite

A cell made with 92% $\beta$-MnO$_2$ ore gave a discharge life of 58 hours when subjected by a discharge test through a 40 ohm resistance 4 hours per day, 7 days per week at 20° C. to an end point of 0.9 v. The discharge curve and open circuit voltage for this cell are shown on FIG. 2 as curve c. A similar cell in which a 4:1 mixture of 92% $\beta$-MnO$_2$ ore and laboratory synthesised hetaerolite was substituted for the manganese dioxide gave 203 hours discharge life on the same discharge test. The discharge curve and open circuit voltage for this cell are shown on FIG. 2 as curve d.

EXAMPLE 3

Addition of Chemically Precipitated Manganese Dioxide

A cathode mix of the following composition was prepared:

| | |
|---|---|
| 92% $\beta$-MnO$_2$ manganese dioxide ore | 22.42g |
| Chemically prepared $\delta$-manganese dioxide (generates hetaerolite on discharge of cell) | 5.61g |
| Zinc oxide | 0.3g |
| Ammonium chloride | 5.96g |
| Acetylene black | 3.55g |
| Zinc chloride solution (S.G. 1.45) | 8.45g |
| Water | 4.08g |

An R20 cell was made with 48.1 g of the above mix. When subjected to a 5 ohm., 30 min. per day, 7 days per week at 20° C. discharge test it gave a life of 26.4 hours down to the 0.75 v end point. The corresponding discharge curve is shown on FIG. 1 as curve e. A calculation showed that the improvement was not due only to the inherent capacity contributed by the chemically precipitated manganese dioxide. A synergistic effect had occured whereby a high discharge efficiency was obtained from the $\beta$-MnO$_2$.

EXAMPLE 4

Addition of Commercial Battery Grade Chemically Prepared Manganese Dioxide

A cathode mix of the following composition was prepared:

| | |
|---|---|
| 84% grade $\beta$-MnO$_2$ manganese ore | 14.01g |
| Synthetic Manganese Dioxide, trade name Faradiser (generates hetaerolite on discharge of cell) (see U.S. Pat. No. 2758012) | 14.01g |
| Zinc oxide | 0.3g |
| Ammonium chloride | 5.96g |
| Acetylene black | 3.55g |
| Zinc chloride solution (S.G. 1.45) | 8.45g |
| Water | 4.08g |

A cell containing 48.1 g of the above mix gave a life of 24.4 hours when subjected to a discharge test through a 5 ohm. resistance for 30 min per day, 7 days per week, down to a 0.75 v endpoint. The discharge curve which was obtained is shown on FIG. 1 as curve f.

The present invention thus enables one to use sources of manganese dioxide previously considered unsuitable for use in cathode mixes and to achieve greater cell and battery capacities using natural ore than has been possible in the past.

What is claimed is:

1. A dry electric cell of the Leclanché type having a cathode mix which, prior to discharge, includes (i) MnO$_2$ having a $\beta$-crystal structure, and (ii) hetaerolite (ZnO.Mn$_2$O$_3$).

2. An electric cell according to claim 1 in which hetaerolite has been added as a separate ingredient to the cathode mix.

3. An electric cell according to claim 1, wherein the $\beta$-MnO$_2$ is one which has been subjected to a chemical or thermal pre-treatment in the presence of zinc or a compound of zinc so as to produce some hetaerolite therein.

4. An electric cell according to claim 1, wherein the $\beta$-MnO$_2$ is obtained from a naturally-occurring ore.

5. An electric cell according to claim 4, wherein the naturally-occurring ore is pyrolusite.

6. A battery including one or more cells, each of which cells is a dry electric cell of the Leclanché type having a cathode mix which, prior to discharge, includes (i) MnO$_2$ having a $\beta$-crystal structure, and (ii) hetaerolite (ZnO.Mn$_2$O$_3$).

* * * * *